United States Patent [19]

Ingraham

[11] 4,031,284

[45] June 21, 1977

[54] INSULATED AND GROUNDED FENCE FABRIC

[75] Inventor: Glen E. Ingraham, Lebanon, N.J.

[73] Assignee: Colorguard Corporation, Raritan, N.Y.

[22] Filed: June 2, 1975

[21] Appl. No.: 582,834

[52] U.S. Cl. .............................. 428/222; 428/255; 256/2; 256/10; 256/45

[51] Int. Cl.² .................. D03D 15/02; A01K 3/00; E04H 17/04; B21F 27/00

[58] Field of Search ........... 428/222, 255; 256/1–2, 256/5, 45, 10; 307/95

[56] References Cited

UNITED STATES PATENTS

| | | | |
|---|---|---|---|
| 2,530,247 | 11/1950 | Koonz | 256/10 |
| 2,533,439 | 12/1950 | Elder | 428/256 X |
| 2,801,823 | 8/1957 | Clements | 256/10 |
| 2,962,057 | 11/1960 | Webber | 428/256 X |
| 3,223,796 | 12/1965 | Willoughby | 256/10 X |
| 3,293,800 | 12/1966 | Martinmaas | 256/10 X |
| 3,504,892 | 4/1970 | Crist | 256/10 |
| 3,562,079 | 2/1971 | Steel | 428/222 |
| 3,747,897 | 7/1973 | Conley | 256/10 |

FOREIGN PATENTS OR APPLICATIONS

| | | | |
|---|---|---|---|
| 1,278,646 | 6/1972 | United Kingdom | 256/10 R |

*Primary Examiner*—Philip Dier

[57] ABSTRACT

Fence fabric formed of a multiplicity of entwining electrically conductive metal wire cores each coated with a heat disintegrable electrical insulation is rendered susceptible to grounding by disposing each of said metal cores in contact with at least one electrically conductive ground element. To produce this product, one or more of the foregoing conductive elements is placed in permanent contact with each coated wire of the fence fabric and sufficient current passed through said conductive element to disintegrate the insulation coating and provide an electrically conductive path between the metal core of each of said wires and said electrical conductor.

14 Claims, 2 Drawing Figures

INSULATED AND GROUNDED FENCE FABRIC

BACKGROUND OF THE INVENTION

While conventional metal fences are electrically conductive and easily grounded, there has been increased use of fence fabric formed of a plurality of metallic electrically conductive wires such as galvanized steel, and the like, each insulated from the other by heat disintegrable electrical insulation. This insulated fence fabric has the advantage of a pleasing esthetic effect and of securing the metal wire substrate against corrosion and oxidation due to mineral acids, sea water and other deleterious agents carried in the air or deposited by alternative means upon the fence in normal usage and which tend to shorten materially the term of usefulness of the fence fabric.

These insulated fence fabrics formed, as they normally are, of a plurality of individual insulated metal wire cores have not been susceptible to grounding heretofore and thus the impetus to use these fabrics about facilities such, illustratively, as electrical generating stations and power substations has been substantially prevented because of the wire's tendency to build up significant unrelievable static electrical charges.

Thus, if it were possible to provide such esthetically attractive, corrosion and weather resistant fence fabrics wherein the multiplicity of wires employed and composed of a metal core and a heat disintegrable non-conductive coating could be readily grounded, the resulting product as well as the means by which it is attained would constitute a significant advance in the state of the art.

SUMMARY OF THE INVENTION

It is accordingly an object of this invention to provide an improved fence fabric formed of a multiplicity of metal wire cores each of which is coated with an electrically non-conductive heat-disintegrable composition and is capable of promptly dissipating any electrical charge formed within one or more of said wires through a grounding component.

It is an object of the invention, additionally, to provide a method of producing the foregoing insulated yet grounded fence fabric which is readily and economically introduced into presently existing wire-making production techniques.

It is a particular object of this invention to provide means for establishing an electrically conductive path between said wire metal cores coated with said insulation coating and said elongated conductive element where said non-conductive coating is formed of a thermoplastic resin.

It is a further object of this invention to provide a fence fabric formed of individually insulated wires all of which are grounded through one or more ground wires in such a manner as to dissipate the static electrical charge produced within said fence fabric when disposed within the corona field common to high-voltage installations such as, illustratively, the generating stations and power substations referred to hereinabove.

Generally, in accordance with this invention, the foregoing as well as other objects are secured by incorporating in a fence fabric an electrically conductive grounding element in electrical contact with the conductive metal core of each of the otherwise insulated wires and at least, and indeed preferably, one elongated electrically conductive element, which may be uncoated or enveloped in a conductive coating, joined in electrical connection with each one of the wires of said fence fabric; the electrical connection being established by passing an electrical current through said electrically conductive element sufficient to disintegrate said coating and produce a conductive path between said wires and said conductor.

The foregoing and other objects, features and advantages of the invention will be evident from the following description taken in conjunction with the accompanying drawing.

DESCRIPTION OF THE PREFERRED EMBODIMENTS

Figure 1:
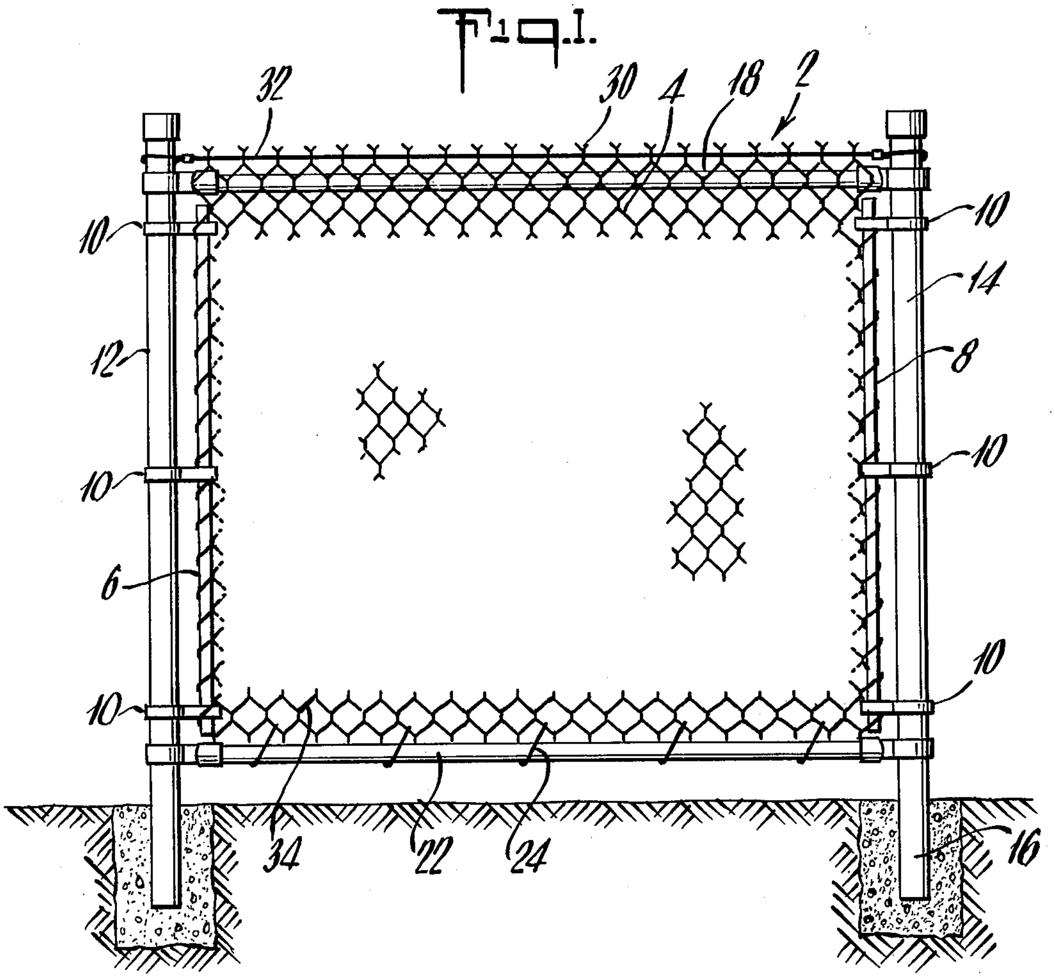
FIG. 1 shows an illustrative fence fabric incorporating the elongated electrically conductive element according to the practice of the invention.

Referring now in detail to the accompanying drawing there is shown in FIG. 1 a chain link fence 2 composed of link fence fabric 4 stretched between the tension bars 6 and 8 which traverse the link fabric 4 at the lateral borders thereof. The tension bars 6 and 8 are secured by brackets 10 to the terminal posts 12 and 14 in conventional manner well-known to those skilled in the art. The fabric is also attached to any intermediate line posts (not shown) by means of tie wires (such as those referred to hereinafter and designated by the integer 24 in FIG. 1.) The posts 12 and 14 and any intermediate line posts are disposed in a vertical position and suitably secured in this position in the ground or other standard foundation, and, preferably one that is conductive to the ground by means of stakes, anchoring shoes or other conventional means 16. Upper and lower tubular bracing members 18 and 22 respectively disposed substantially parallel to the ground and each other are connected to the normally electrically conductive terminal posts 12 and 14 with conventional fence fittings. The fence fabric or mesh 4 is secured to the lower or bottom brace 22 at regular intervals by means of the tie wire 24. The upper selvage 28, as shown illustratively in FIG. 1, of the link fabric or mesh 4 adjacent the upper brace 18 is twisted to provide a plurality of barbs 30, as shown particularly in FIG. 2, through which, in a substantially horizontal manner, is extended the elongated electrically conductive element 32 formed of metallic wire or cable in the drawing which is grounded by attachment to the posts 12 and 14 or other conventional means such as ground stakes or the like in such manner as to establish an electrical connection for grounding. Where the terminal posts 12 and 14 or intermediate line posts are intended to be used for grounding; and they are supported in a base such as cement, care must be observed to use an electrically conductive cement such as illustrated by the numerical designation 32 in FIG. 1.

The construction of the fence incorporating the fence fabric 4, as well as the conformation or pattern of the wire forming mesh 4 and employed in the fence is, of course, subject to wide variation. Indeed, the manner by which the ground wire or conductor 32 is permanently locked into electrical connection with each of the wires or pickets 34 of the mesh 4 is also capable of wide variation readily evident to those skilled in the art. Further the barbs 30 may be provided, alternatively or in addition, along the bottom of the fence adjacent the lower brace 22 or if desired the pairs of wire forming each barb 30 may be so interlocked that each pair of wires terminating in a single barb 30 may do so along one or more of the lateral borders of the fabric 4 adjacent one or more of the posts 12 and 14. Other suitable, if less preferred, orientations, for example, a diagonal construction, will also be evident to those skilled in the art to which this invention pertains.

It will be evident, additionally, that the helical engagement of pairs of individual helically engaged coated wires or pickets 34 with the conductor element 32 passing transversely therethrough may occur at some point intermediate of their terminal ends rather than in the normally preferred terminal twist or barb construction 30. The elongated conductor 32 is, as evidenced in the drawings, a wire stranded cable. The term "wire" as employed herein is thus intended to encompass both conventional wire and cable construction so long as it is capable of performing the function prescribed for it according to the present invention.

This wire may be a monofilament or composed of multiple strands, and, as indicated above, can be bare or encompassed by a conductive coating. This element is particularly preferred in the form of a multifilament stranded cable because of the high degree of flexibility incorporated inherently in this construction; a property which provides a ready incorporation of the conductor element 32 in the twist or barb 30. It will be evident, too, that the conductor element 32 incorporated in various patterns of mesh 4 can be incorporated in a vase variety of fences, gates, and the like and the conductor 32 attached desirably to the line and end posts 12 and 14, as shown in FIG. 1 and discussed hereinbelow.

It will be evident that while engagement of the conductor 32 in a helical coil and particularly the terminal barbs 30 is significantly preferred, other means of engaging the conductor element 32 are also feasible. It will be obvious too that while it is materially more desirable to introduce the conductor between each barb 30 of the fabric 4 it is only essential that it be so engaged with a substantial number, and at least a majority of said barbs along the length of said fabric 4 in any section thereof. It has also been found that ground wires 32 (disposed along opposite borders or selvages of said fabric 4 in the manner described herein are particularly effective in removing any static charge which would otherwise tend to accrue thereon. The desirability of this dual construction of ground wires will vary with the width of the fabric, but fence fabric in excess of twenty-four inches in width, illustratively, will benefit materially by the inclusion of ground wires along the two opposite selvages of the fabric parallel to its length.

Figure 2:
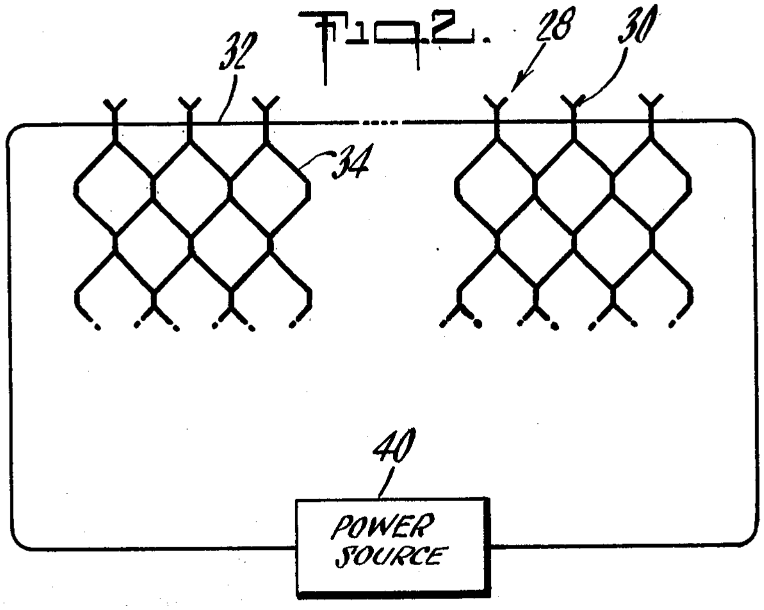
FIG. 2 is a fragmentary cross-sectional view of a portion of the fence fabric shown in FIG. 1 and the elongated electrically conductive element incorporated therein and the ends of said conductor connected to a power source, the foregoing embodying principles of the present invention.

The conductive path is established between the elongated conductor element 32 and each of the wires 34 wisted to form the barb 30 in a preferred embodiment by insertion of the conductor element 32 between the wire (34) ends prior to their being twisted in an otherwise conventional mesh (4) production technique using a standard fence weaving loom well-known to those skilled in the art. The closest contact is afforded the insulated wires 34 and conductor element where the latter element is formed of highly flexible multifilament wire or cable.

Where the heat disintegrable insulation is produced from an organic material such as resin, a carbon deposit may be formed to provide an additional low resistance conductive path between the metal cores of the wire pairs embraced in each barb and the electrical conductor when a current of sufficient amperage is passed therethrough from an electrical power source 40, illustratively, a generator or electric arc welder, as shown in FIG. 2, wherein the opposite ends of the conductor element 32 are connected to the electrodes of the power source to effect disintegration of the insulation disposed between the wires'(34)metal cores and conductor 32.

The required current to effect the necessary disintegration will vary, illustratively, with the metal conductor, its length, the insulation employed and thickness both of the conductor and insulation and the period to effect the requisite contact. Where a thermoplastic resin such as plasticized vinyl chloride resin is used and a galvanized steel wire of multi-strand or single strand construction is employed as the conductor 32, for example, it is adequate to effect a melting of the resin as a result of which a satisfactory metal-to-metal contact between the conductor 32 and each of the wires 34 of each of the barbs 30 of the fabric 4 is effected. The conductor or ground wire 32 can be heated in any length, by way of illustration, from 1 to 2 inches to a roll of 50 feet or more, having a width also of several inches such as 1 to 2 inches or upwards of 120 inches or more. The current is maintained normally for a period of 0.03 minutes to 1.0 minute employing desirably, and by way of illustration, and amperage source of 50 to 400 amperes and most desirably a 300 ampere power source, and a plasticized polyvinyl chloride as the insulating organic resin.

By way of further illustration, the length or time required to heat a length of multi-strand wire or cable 32 of 3/32 inch diameter (and a wire having a diameter of about 1/10 to 1/15 inch diameter is generally preferred) adequate heat is induced in the wire in a period of about one second for a length of conductor 32, 2 to 3 inches long using a 150 to 180 ampere power source, and up to one minute for a 50 foot length of the same conductor at 250 amperes. The temperature thus secured at the point of contact of conductor 32 and insulated wire 34 where a flexible multi-stand wire conductor is employed and a plasticized vinyl chloride resin provides the insulation is at least 300° Fahrenheit (F.) and desirably within the range of 300° to 600° F. A temperature of about 400° to 500° F. has been found most efficacious in terms of the reduced period of exposure required and the electrical connection provided. Shorter periods of current application and reduced amperage are obviously required where shorter sections of the conductive cable or wire 32 are contacted.

Heating of the conductor to secure effective electrical connection between the barbs 30 and conductor 32 may also be accomplished by induction heating of the conductor element 32; illustratively by placing a coil powered by a standard high frequency induction generator about the length of the conductor extending between adjacent barbs. Whichever of the foregoing methods of heating is employed in standard commercial production of, illustratively, chain link fence no interruption or slowing of that process is necessitated by the practice provided herein.

Indeed, while it will be obvious that the incorporation of the conductor element 32 can even be incorporated manually, a preferred embodiment contemplates heating of short sections of the wire conductor 32 in the automatic operation of the loom conventionally employed, illustratively, in weaving conventional chain-link fence.

The coating to be disintegrated, which latter term is intended to embrace as employed through this specification, melting as well as, for example, any production of a thin carbon deposit, is in most instances within the range of 0.01 inch to 0.150 inch in thickness where the invention is applied using a vinyl halide resin sintered, extruded, or as a solution, organosol or plastisol coating upon a chain-link fence fabric, the coating thickness being substantially thinner and at the lower end of the foregoing range where the coating is effected by other than extrusion.

The vinyl resins contemplated for use herein include commercially available vinyl halide, and particularly vinyl chloride, homopolymer, as well as copolymers containing at least 75 per cent by weight of vinyl chloride and up to about 30 per cent by weight of one or more other polymerized comonomers. Illustrative of the vinyl comonomers for use in the foregoing copolymers are vinyl esters of the general formula:

$$CH_2{=}CH{-}O{-}\overset{\overset{\displaystyle O}{\|}}{C}{-}R$$

wherein R is a lower alkyl moiety and one preferably of from 2 to 4 carbon atoms. Illustrative of the comonomers are vinyl acetate, vinyl butyrate and vinyl propionate.

The fence fabric coming within a preferred embodiment of this invention is conventional vinyl chloride resin coated chain-link fence.

The vinyl resins thus employed in the practice of the invention provide the most significantly effective protective properties including resistance to abrasion, weathering, oxidation and attack by a variety of other chemicals while being relatively inexpensive and easily handled.

Other extrudable thermoplastic resins which may also be used, however, in the practice herein described include the polyolefins, notably low density polyethylenes and most desirably those having a low-melt index of from about 0.2 to 0.4 as measured by ASTM Procedure D-1238-65T; and polyamides, such as nylon-6 and nylon-12, which are pigmented and stabilized for long outdoor exposure.

The foregoing vinyl chloride homopolymers and copolymers are combined with plasticizer and preferably mixtures thereof, in an amount by weight of about 25 to about 40, and preferably about 28 to 32, parts for every 100 parts of resin (phr.). Included among these plasticizers are liquid plasticizers among which are the alkyl and alkoxy alkyl esters of dicarboxylic acids or the esters of polyhydric alcohol and a monobasic acid; and more specifically, phthalate plasticizers, such as dioctyl phthalate, butyl octyl phthalate, di-2-ethylhexyl phthalate di-isodecyl phthalate, N-octyl phthalate, dinonyl phthalate, diisooctyl phthalate, butyl lauryl phthalate, butyl benzyl phthalate, and ethyl phthalyl ethyl glycolate; dibasic acid ester derivatives such as dioctyl adipate, dioctyl azelate, dioctyl sebacate, dibutyl-sebacate and glyceryl stearate, Also contemplated as plasticizers are phosphates such as trioctyl phosphate, triphenyl phosphate and tricresyl phosphate; as well as chlorinated fatty acid esters, alkyl epoxy stearates, epoxides of soya bean oil fatty acid, and epoxy linseed oil.

Plasticizers which are particularly preferred for use in combination with the foregoing resins are plasticizers with a relatively low tendency to migrate or volitalize. Illustrative of these are polymer plasticizers such as linear polyesters formed from propylene glycol, ethylene glycol and adipic or sebacic acid which are end-capped with monohydric alcohols or monobasic acids.

Other conventional components include stabilizers and pigments, normally from about 1 to 9 phr., and preferably about 3.5 to 5 phr. thereof. These components are well-known within the field and commercially available. The stabilizers employed particularly as thermal and light stabilizers, such as illustratively, benzophenone and benzotrizole derivatives usually in an amount by weight of about 0.05 to 0.3 phr. or higher, and dibasic lead phospite or calcium, barium, cadmium and zinc salts in an amount by weight of about 0.05 to 0.3 phr. Pigments employed in amounts of 0.0001 to 3.0 phr., are also well-known and include, for example, phthalocyanine green, phthalocyanine blue, carbon black and titanium dioxide.

The resulting plasticized polyvinyl chloride resin composition contain most desirably, no fillers, extenders or other extraneous matter. The colors or pigments are stabilized with conventional stabilizers as aforesaid, have a light fastness that shall withstand a minimum Weather-O-Meter exposure of 4000 and up to 5000 hours without any deterioration (Test Equipment Operating ASTM D 1499, E 42 Type and 649) as applied to wire and pipe coating respectively. The extrusion grade semi-rigid vinyl resin utilized will have most desirable a maximum specific gravity of 1.30 to 1.32 (ASTM D 792); a hardness of about Durometer A 75 to 95, Shore A Durometer and preferably about 88 to 93; a tensile strength of about 1500 to 3500 (pounds per square inch gauge) psig and preferably about 2700 psig (ASTM D 412) and an ultimate elongation of about 270 to 280 per cent (ASTM D 412). This protective vinyl resin is characterized by high abrasion resistance, maximum deformation of 15% at 120° C. (Underwriter Laboratories Test Procedure) under a 500 gram load and compression cut through of 1500 psig to 1800 psig and preferably 1700 to 1800 psig (Bell Laboratory Test Procedure). The vinyl clad product will withstand an accelerated aging test of 2000 hours at 145° F. without cracking or peeling.

The metallic core or substrate of the insulated wires 34 treated according to the practice of the invention may vary substantially as to conformation, flexibility and the metal employed. Illustratively, the process herein described has application to relatively smooth metallic surfaces such as copper, aluminum, brass, magnesium, steel, whether galvanized, ungalvanized, bethanized, aluminum coated or high strength, low alloy steels in which the alloy is, for example, chromium, silica, copper, nickel, phosphorus alloy (sold by the U.S. Steel Corporation under the trade name COR-TEN A steel) or a manganese, chromium, vanadium alloy (sold by U.S. Steel Corporation as COR-TEN B steel) or steel surface treated with phosphoric acid for example. While the dimensions of the metal core or substrate to be coated are not narrowly critical, preferred where the wire is to be used in making chain-link fence is a metal core having a cross-sectional diameter within the range of about 0.076 inch to about 0.192 inch. Indeed, the invention is especially practicable for use with normally rigid wire of this diameter and having, in addition, a tensile strength of 65,000 to 120,000 psi.

The presence of a layer of a hot-melt adhesive or other organic resin or combinations thereof between the foregoing wire metal core and outer insulation coating will not adversely affect the practice of the invention and is contemplated as within the formulations capable of being melted by the current passed through the conductor 10.

The following example is further illustrative of the invention.

EXAMPLE

This example illustrates the production of fence fabric incorporating the practice of the invention.

A 3/32 inch multi-strand flexible stainless steel wire conductor was passed substantially transversely between the ends of a multiplicity of pairs of insulated 9 gauge outer-diameter wires having an inner metal core of approximately 12 gauge (about 0.106 inch diameter) entwined on a conventional fence weaving loom to form 2-inch mesh size (that is, the distance between the wires forming parallel sides of the mesh) chain link fence with the terminal portions of each pair of interlocked pickets or wires of the resulting fence fabric twisted by the loop to form a series of barbs through each of which barbs sequentially the conductor element passes in permanently locked engagement.

The length of fabric so prepared was then delivered from the loom and to the opposite ends of the conductor connected to the electrodes of an electric arc welder which generated a current of 300 amperes through the conductor for a period of 0.3 minutes, whereupon the heated wire conductor had melted through the resin insulation coating of the pickets or wires of each of the barbs of the fabric providing metal-to-metal contact between the conductor element and the metal core formed of galvanized steel of each of the coated wires in each of the fabric's barbs. The resin coating surrounding the metal core in each instance was about 0.022 inch thick and the outside diameter of each wire was about 0.150 inch. The resin insulation was plasticized polyvinyl chloride having a light fastness sufficient to withstand (1) a minimum Weather-O-Meter exposure of 4000 hours without deterioration (Test Equipment Operating Light and Water Exposure Apparatus Carbon-Arc Type) ASTM D 1499, E 42 Type E, and (2) an accelerated aging test of 2000 hours at 145° F. without cracking or peeling. The resin had, in addition, a tensile strength gravity of 2700 psi, ultimate elongations of 275%; a specific gravity of 1.30 maximum; a hardness not less than Durometer A 90 ± 5; maximum deformation of 15% at 120° C. under a 500 gram load and a compression cut through of 1500 psi; when measured by the appropriate test procedures recited in the description appearing hereinabove.

It will be evident that the terms and expressions which have been employed are used as terms of description and not of limitation. There is no intention in the use of such terms and expressions of excluding equivalents of the features shown and described or portions thereof and it is recognized that various modifications, by way of illustration but not of limitation, variations in proportions, procedures and materials are possible within the scope of the invention claimed.

What is claimed is:

1. In a fence fabric construction formed of a plurality of individually coated wires each composed of a metal core enveloped by a heat-distintegrable electrically non-conductive coating, adjoining pairs of said coated wires being engaged at, at least, one point along their length, the improvement that comprises an elongated metal conductor element permanently interlocked by, and defining a passage through, each of said adjoining pairs of coated wires at the point of engagement thereof with each other; said conductor element being disposed in electrical connection with the metal cores of each of said adjoining coated wires at each if said points of engagement.

2. A fence fabric as claimed in claim 1 wherein said adjoining pairs of coated wires are disposed in helical coils.

3. A fence fabric as claimed in claim 2 wherein said helical coils form terminal barbs along at least one selvage of said fence fabric.

4. A fence fabric as claimed in claim 3 wherein said barbs are disposed along two selvages of said fence fabric.

5. A fence fabric as claimed in claim 1 wherein said elongated metal conductor element is a ground wire.

6. A fence fabric as claimed in claim 5 wherein said elongated electrical conductor is a flexible multi-strand wire.

7. A fence fabric as claimed in claim 5 wherein said elongated electrical conductor is a single strand wire.

8. A fence fabric as claimed in claim 1 wherein said elongated metal conductor is disposed substantially transversely through helical coils.

9. A fence fabric as claimed in claim 1 wherein said coating is a thermoplastic resin.

10. A fence fabric as claimed in claim 9, wherein said coating is a thermoplastic resin prepared from a vinyl halide comonomer alone or together with a vinyl ester monomer of the formula $$CH_2CHO\overset{\overset{O}{\|}}{C}R$$

wherein R is a lower alkyl moiety.

11. A fence fabric as claimed in claim 9 wherein said thermoplastic resin is plasticized polyvinyl chloride.

12. A fence fabric as claimed in claim 1 wherein said conductor element is in electrical connection with the ground.

13. A fence fabric as claimed in claim 1 wherein said fabric is woven.

14. A fence fabric as claimed in claim 13 wherein said fence fabric is of chain-link construction.

* * * * *

UNITED STATES PATENT OFFICE
CERTIFICATE OF CORRECTION

Patent No. 4031284 Dated June 21, 1977

Inventor(s) GLEN E. INGRAHAM

It is certified that error appears in the above-identified patent and that said Letters Patent are hereby corrected as shown below:

Column 3, line 36, change "vase" to ---vast---.

Column 3, line 50, delete "(".

Column 3, line 62, change "wisted" to ---twisted---.

Column 5, line 11, change "through" to ---throughout---.

Column 7, line 31, change "loop" to ---loom---.

Column 8, line 20, change "if" to ---of---.

Claim 10, line 3, change "comonomer" to ---monomer---.

Claim 10, line 4, change "monomer" to ---comonomer---.

Signed and Sealed this

*First* Day of *November 1977*

[SEAL]

*Attest:*

RUTH C. MASON
*Attesting Officer*

LUTRELLE F. PARKER
*Acting Commissioner of Patents and Trademarks*